United States Patent [19]
Kürbitz et al.

[11] Patent Number: 4,842,247
[45] Date of Patent: Jun. 27, 1989

[54] METHOD AND APPARATUS FOR THE DETECTION OF HELICOPTERS

[75] Inventors: Gunther Kürbitz, Aalen; Karl-Heinz D. Simon, Oberkochen; Hans-Richard Weinheimer, Königsbronn, all of Fed. Rep. of Germany

[73] Assignee: Carl-Zeiss-Stiftung, Heidenheim/Brenz, Oberkochen, Fed. Rep. of Germany

[21] Appl. No.: 944,606

[22] Filed: Sep. 14, 1978

[30] Foreign Application Priority Data

Sep. 16, 1977 [DE] Fed. Rep. of Germany ..... 27417896

[51] Int. Cl.$^4$ .............................................. G01J 1/00
[52] U.S. Cl. ..................................... 250/342; 250/340
[58] Field of Search ............ 343/5 SA; 250/338, 339, 250/340, 342; 342/192

[56] References Cited

U.S. PATENT DOCUMENTS 3,582,970  6/1971  Williams .
3,733,603  5/1973  Johnston ......................... 343/5 SA
4,001,820  1/1977  Rosenbaum et al. ............ 343/5 SA
4,040,744  8/1977  Schertz et al. ..................... 250/339

FOREIGN PATENT DOCUMENTS 2655520  6/1978  Fed. Rep. of Germany .
1268620  3/1972  United Kingdom .

Primary Examiner—Stephen C. Buczinski
Attorney, Agent, or Firm—Hopgood, Calimafde, Kalil, Blaustein & Judlowe

[57] ABSTRACT

The presence of an operating helicopter within a given field of view is remotely and passively monitored by optically imaging the field of view at a focal surface, using an infrared detector to produce an electrical signal. The electrical signal is filtered with a narrow passband having a center frequency which is adjustable over a range which spans the respective modulation frequencies of characteristic infrared radiation emitted by the rotating blades of each of a plurality of helicopters of different type. Provision is made to indicate such component of the electrical signal as survives the filtering step.

8 Claims, 2 Drawing Sheets

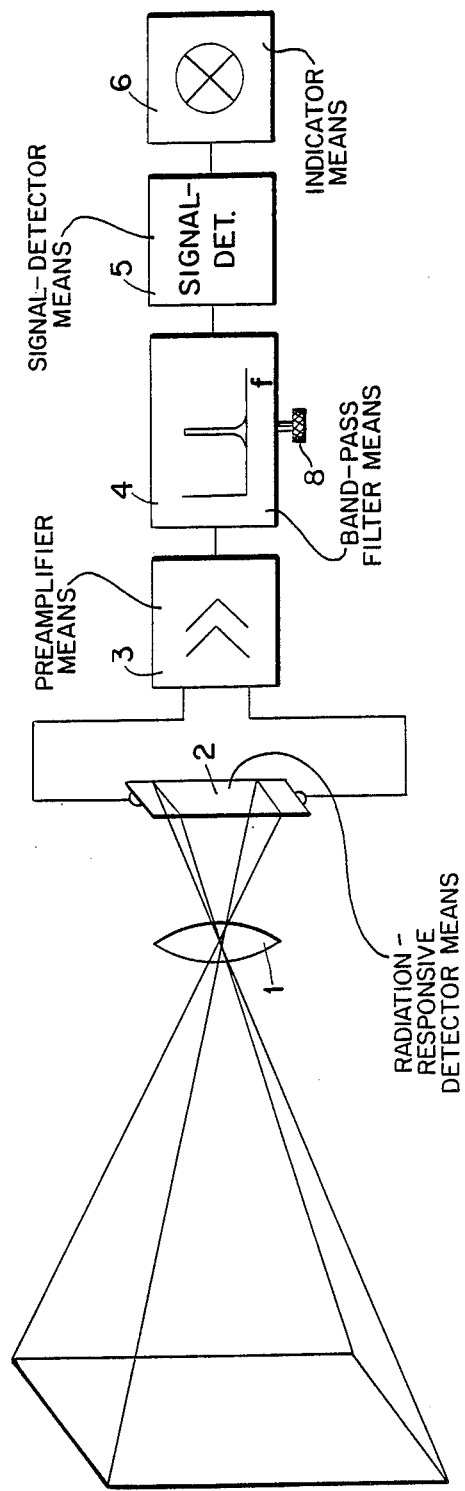

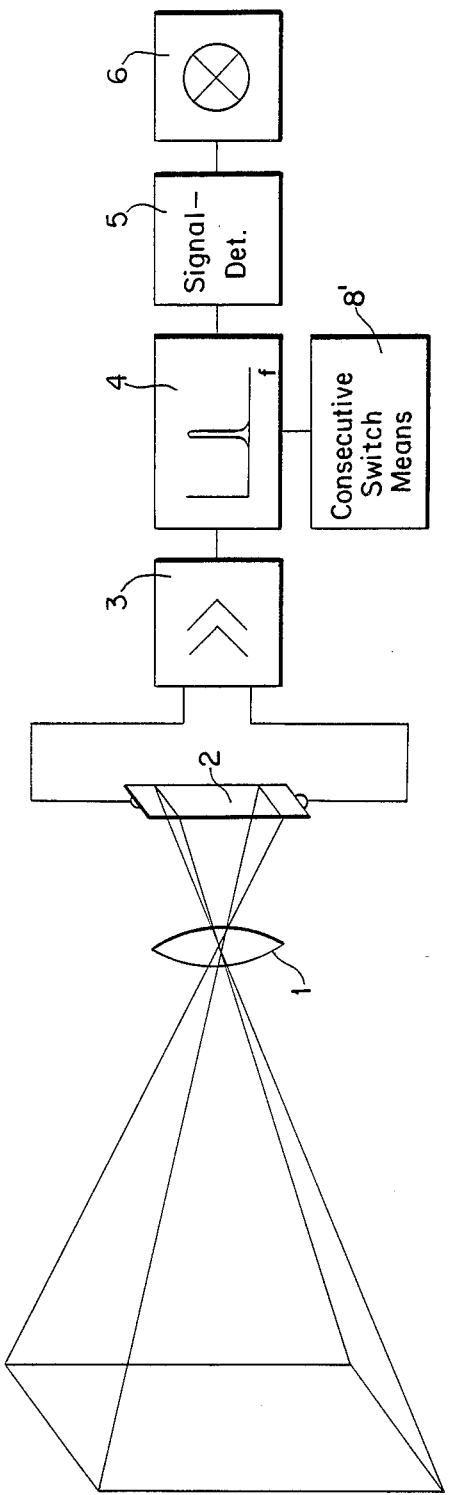

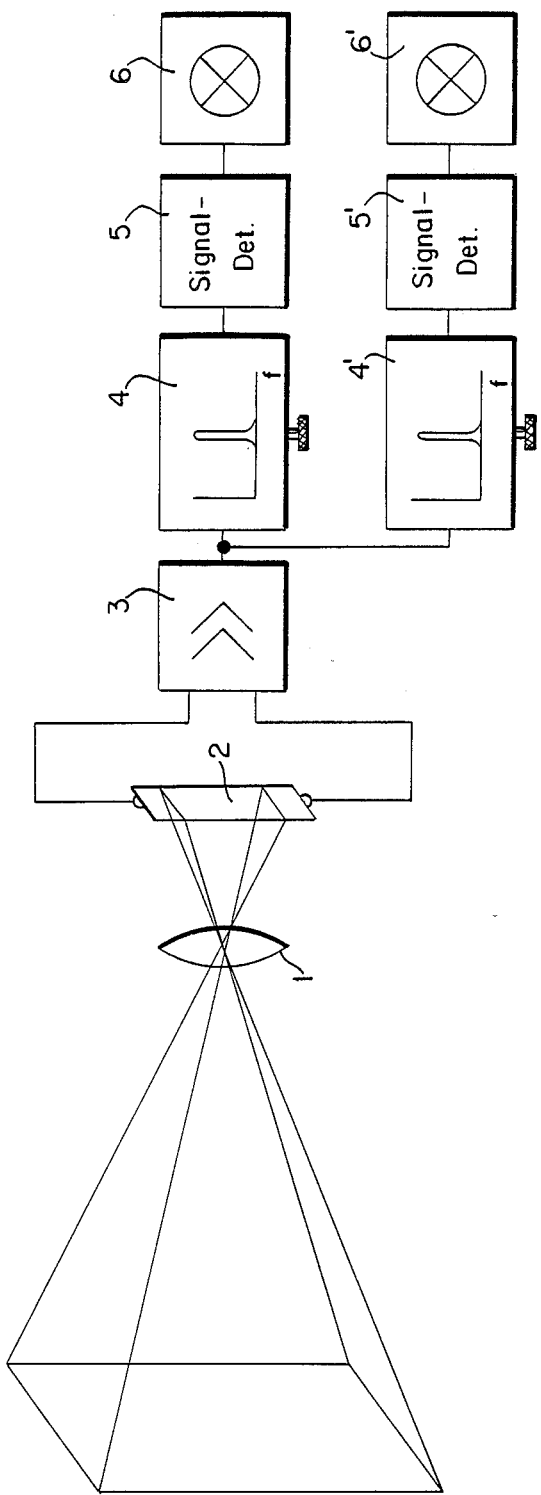

METHOD AND APPARATUS FOR THE DETECTION OF HELICOPTERS

The invention relates to a method and apparatus for the detection of helicopters at long range.

The early recognition of helicopters is important for the crew of vehicles, especially armoured vehicles. For the purpose of combating armoured vehicles, for example, special defensive helicopters have been developed, the early detection of which is of great importance for the armoured vehicle.

The problem of the invention is to enable the armoured vehicle crew to detect approaching helicopters as early as possible.

This problem is solved according to the invention by the fact that the modulated characteristic radiation, caused by the turning of the helicopter rotor, of the rotor blades and/or of the background radiation is filtered out of the total radiation of the scene to be observed and is supplied to an indicator.

Modulation is brought about by variation during revolution of the rotor of the rotor silhouette projected in the direction of observation. If the rotor blades of a, for example, twin-blade rotor are perpendicular to the line of observation, the rotor face turned towards the observer and, consequently, also the measured characteristic radiation of the rotor is at maximum. In this case, the detector receives a maximal signal. The part of the background radiation masked by the rotor with a fixed field of vision is, in this case, likewise at maximum and a detector to receive the modulated background radiation consequently receives a minimal signal. Upon rotation of the rotor through 90° the radiated modulated characteristic radiation of the rotor is at minimum, while the background radiation reaching the observer is at maximum. After further rotation of the rotor through 90° the rotor silhouette face pointing towards the observer is again at maximum and after yet further rotation through 90° again at minimum. The characteristic radiation reaching the observer as well as the background radiation reaching the observer is therefore modulated during rotation of the rotor with a frequency which is equal to the product of rotor speed and number of rotor blades and a factor G. The factor G has the value 1 or 2, depending on whether the number of rotor blades is even or odd.

Suitable apparatus for the detection of helicopters by the method according to the invention is distinguished by the fact that there are provided for the scene to be observed imaging optics which form an image of the scene on a detector, that a filter circuit is provided to process the detector signal and that the filter circuit is followed by a signal detector with the property of a comparator, which supplies the signals caused by the helicopter to an indicator.

Advantageously, the filter circuit has a band-filter characteristic whose centre frequency is adjusted to the modulating frequency of the helicopter to be detected.

The detector used for detection of the modulated characteristic radiation of the rotor blades is an infrared detector in the 10 $\mu$m range, while a photodetector can be employed for detection of the modulated background radiation.

A preamplifier is advantageously connected after the detector.

The filter circuit can be designed as an electronic filter circuit working in an analogue manner, as an electronic filter circuit working in a digital manner or as an analogue-digital converter and at least one programmed digital computer.

The band width of the filter circuit is small (i.e., narrow pass-band) and is adapted so as to allow for the fact that the rotor speeds of helicopters vary only by a few percent.

The signal detector with the property of a comparator supplies to the indicator signals from a certain minimum size—consequently, from a signal-to-noise ratio given by the design of the circuit.

If the apparatus is to be capable of detecting more than one type of helicopter, then a circuit sequence of filter, signal detector and indicator must be connected after the preamplifier for each modulating frequency to be detected.

In the case of filtering of signals by means of software on a digital computer, several frequencies can be determined consecutively even in the so-called time-multiplex system by a single circuit sequence composed of filter, signal detector and indicator.

In many cases, because of the signal-to-noise ratio it is not possible to use only a single signal channel to monitor a desired scene. Several signal channels must then be provided to achieve the required total field of vision. Their individual fields of vision can be joined to one another without boundaries or can leave certain gaps. If the time allowed for detection of the helicopter permits, these gaps must then be covered by a suitable scanning movement. Here, also, it is possible, instead of designing in parallel the complete channels which comprise the detector preamplifier, filter and indicator, to design in parallel only the channel components comprising the detector and preamplifier, in order to cover the desired total field of vision, and to carry out modulation recognition consecutively by means of a programmed digital computer in the so-called time-multiplex system.

In further and advantageous forms of construction of the invention the signals which come from the individual channels and contain information on the direction and, if required, also on the modulating frequency and, consequently, the type of helicopter located can be fed to a fire control computer and be used to direct a suitable sighting and/or defensive means.

Another advantageous embodiment of the invention provides the connection of an automatic alarm release device to the signal detector.

An exemplary embodiment of the apparatus according to the invention is described in detail hereinafter by reference to the drawing wherein:

FIG. 1 is a schematic illustration of an embodiment of the apparatus according to the invention;

FIGS. 1a and 1b are diagrams similar to FIG. 1, to show further embodiments;

Figure 2A:
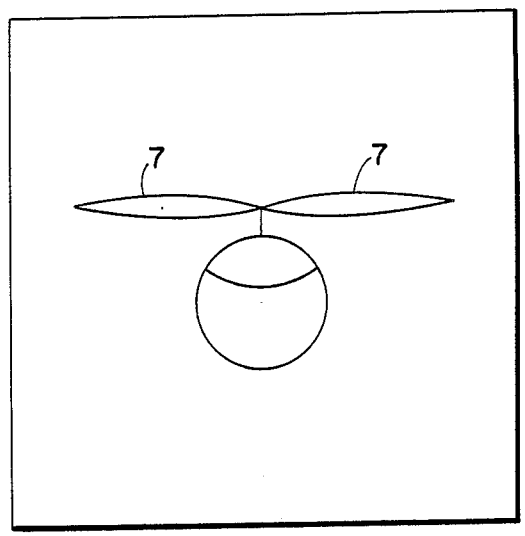
FIGS. 2a and 2b are similar representations of the respective two extremes of helicopter-rotor aspect, as they account for passively observed modulated radiation, involved in use of the invention.

In FIG. 1 the scene to be observed is designated by 1a. It is imaged by the optics 1 on a detector 2. The preamplifier 3 is connected after the detector 2. The output of the preamplifier 3 is connected to a filter circuit 4. The filter circuit 4 is followed by a signal detector 5 with the property of a comparator, which supplies the signals from a certain minimum size to the indicator 6 where they are displayed.

In FIG. 1, the knob 8 will be understood to suggest adjustment means whereby the centre frequency of the band characteristic of filter means 4 may be adjusted to the modulating frequency of the helicopter to be detected.

In FIG. 1a, consecutive switch means 8' replaces the adjustable means 8 of FIG. 1, to provide a time-multiplexed pattern of controlling the selection of centre frequency at filter means 4, the successive centre frequencies of such multiplexing being individually significant for the detection of each of a plurality of different types of helicopter.

In FIG. 1b, further filter means 4', signal-detector means 5' and indicator means 6' provide a second channel responsive to the output of preamplifier means 2, with filter means 4' adjusted to detect a different type of helicopter than that for which filter means 4 is adjusted, thereby providing separate indications at 6—6', depending on the type or types of helicopters detected.

In the illustration of FIG. 2a the rotor blades 7 of a twin-blade rotor are perpendicular to the line of observation. The rotor face turned towards the observer and, consequently, the characteristic radiation of the rotor is at maximum. In this position of the rotor blades the background radiation is covered to a maximal degree, hence the background radiation striking a detector is at minimum in this case.

Figure 2B:
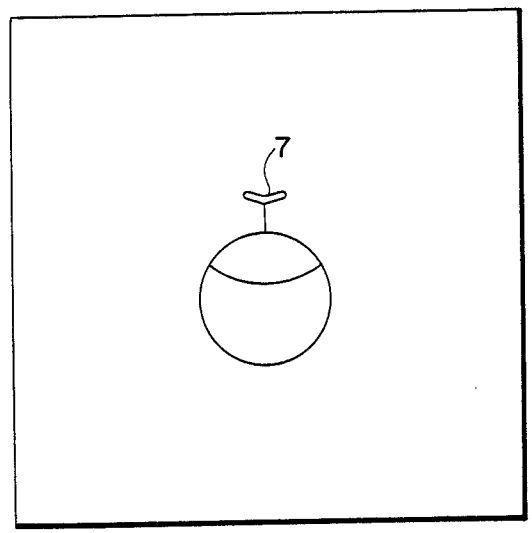

In the illustration of FIG. 2b the rotor has turned through 90° in relation to the initial position shown in FIG. 2a. The rotor face turned towards the observer and, consequently, also the characteristic radiation of the rotor is at minimum, while the background radiation is at maximum in this position of the rotor blades.

What is claimed is:

1. The method of remotely and passively detecting the presence of an operating helicopter within a given field of view, said method comprising the steps of:
   (a) optically imaging said field at a focal surface;
   (b) selecting a detector which will produce an electrical-signal output in response to incident infrared radiation;
   (c) positioning said detector in said surface to thereby monitor said field of view for emitted infrared radiation, whereby said detector will produce an electrical signal corresponding to such emitted infrared radiation;
   (d) filtering said electrical signal with a narrow passband having a center frequency corresponding to the modulation frequency of the characteristic infrared radiation emitted by the rotating rotor blades of a helicopter; and
   (e) providing an indication of such component of said electrical signal as survives the filtering step.

2. The method of claim 1, in which the selected detector is responsive to infrared radiation in the 10 μm range.

3. The method of remotely and passively detecting the presence of an operating helicopter within a given field of view, said method comprising the steps of:
   (a) optically imaging said field at a focal surface;
   (b) selecting a photo-detector which will produce an electrical-signal output in response to incident radiation;
   (c) positioning said photo-detector in said surface to thereby monitor said field of view for emitted background radiation, whereby said detector will produce an electrical signal corresponding to such emitted background radiation;
   (d) filtering said electrical signal with a narrow passband having a center frequency corresponding to a modulation frequency that is characteristic of modulation of background radiation by the rotating rotor blades of a helicopter; and
   (e) providing an indication of such component of said electrical signal as survives the filtering step.

4. The method of claim 1 or claim 3, in which said filtering step is one of a plurality of consecutive like filtering steps, each of said filtering steps being at a different center frequency corresponding to the modulation frequency which is characteristic of radiation modulation produced by rotating the rotor blades of a different type of helicopter.

5. The method of claim 1 or claim 3, in which said filtering step is one of a plurality of separate like concurrently performed filter steps, each of said filtering steps being at a different center-frequency corresponding to the modulation frequency which is characteristic of radiation modulation produced by the rotating rotor blades of a different type of helicopter.

6. Apparatus for passive detection of the presence of an operating helicopter within a given field of view, comprising optical means to image said field at a focal surface, a radiation detector positioned in said surface and producing an electrical-output signal in response to incident radiation at said surface, a narrow pass-band filter circuit connected to the electric-signal output of said detector, said filter circuit having a center frequency corresponding to a modulation frequency that is characteristic of radiation modulation by the rotating rotor blades of a helicopter, signal-detector means having the property of a comparator and being connected to the output of said filter circuit, and an indicator connected to the output of said signal-detector means.

7. The apparatus of claim 6, wherein the center frequency of said filter circuit is adjustable.

8. The method of remotely and passively detecting the presence of an operating helicopter within a given field of view, said method comprising the steps of:
   (a) optically imaging said field at a focal surface;
   (b) selecting a detector which will produce an electrical-signal output in response to incident infrared radiation;
   (c) positioning said detector in said surface to thereby monitor said field of view for emitted infrared radiation, whereby said detector will produce an electrical signal corresponding to such emitted infrared radiation;
   (d) filtering said electrical signal with a narrow passband having a center frequency which is adjustable over a range which spans the respective modulation frequencies of characteristic infrared radiation emitted by the rotating rotor blades of each of a plurality of helicopters of differing type;
   (e) providing an indication of the electrical-signal portion which survives the filtering step; and
   (f) adjusting the center frequency to a selected one of said modulation frequencies.

* * * * *